H. W. BEINS.
Beer-Coolers.
No. 155,917.                                Patented Oct. 13, 1874.
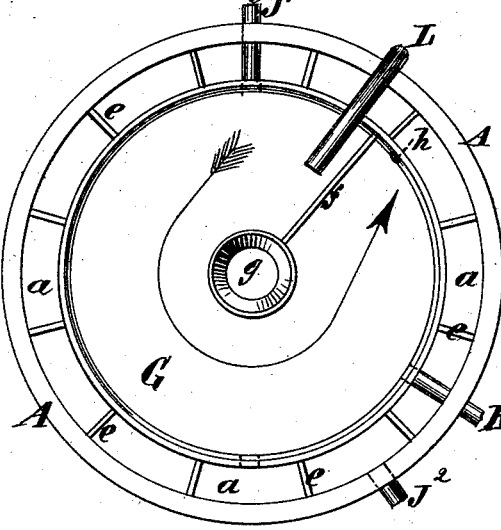
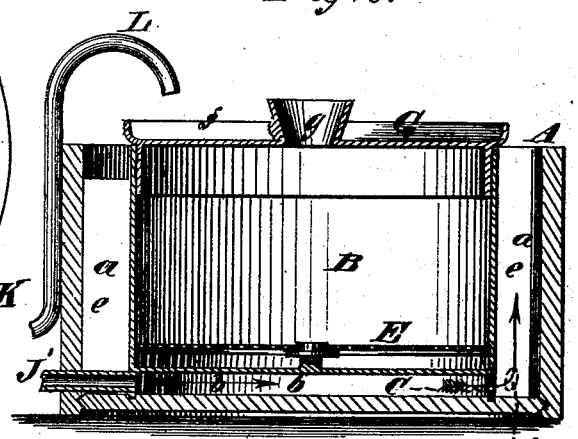
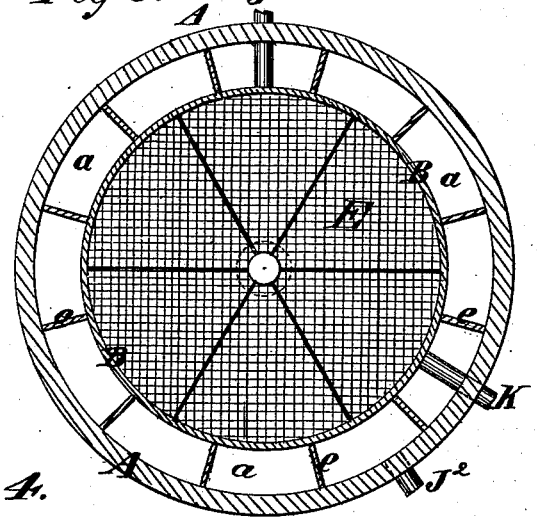
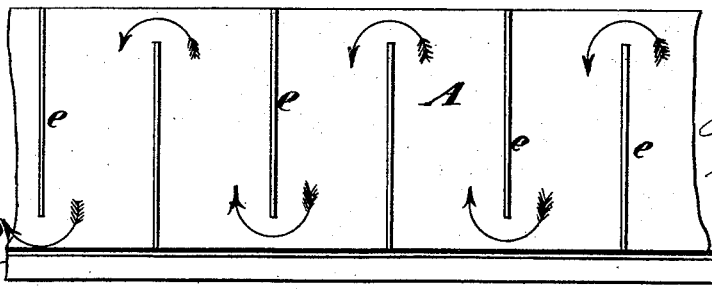
Witnesses

UNITED STATES PATENT OFFICE.

HENRY W. BEINS, OF NEW YORK, N. Y.

IMPROVEMENT IN BEER-COOLERS.

Specification forming part of Letters Patent No. 155,917, dated October 13, 1874; application filed August 27, 1874.

*To all whom it may concern:*

Be it known that I, HENRY W. BEINS, of New York, in the county and State of New York, have invented an Improved Beer-Cooler, of which the following is a specification:

My invention consists in the combination of a tub or outer vessel, a tank or inner vessel, and a peculiar construction and arrangement of parts, whereby the beer or other liquid is strained or filtered, and is subjected to the action of a continuous circulation of cold water above, below, and around the vessel containing said liquid, as hereinafter particularly described.

In the accompanying drawing, Figure 1 is a top view of my improved cooling-vessel. Fig. 2 is a central vertical section of the same. Fig. 3 is a horizontal section. Fig. 4 is a plane projection of the inner side of the outer vessel.

A represents a tub or similar vessel made of any suitable material, preferably of wood. B is a cylindrical vessel made of metal or other suitable substance which is a good conductor. The vessel B is somewhat smaller than the vessel A, and is placed inside of the same, so as to leave an annular space, $a$, between the outer side of the outer vessel. (See Figs. 2 and 3.)

On the bottom of the inner vessel is a circular rim, C, which extends entirely around the circumference of said bottom, and projects downward, and fits closely in an annular groove in the bottom of the tub or outer vessel A, so as to leave a space, $b$, between the bottom of the inner vessel and the bottom of the outer vessel. (See Fig. 2.)

On the outer side of the vessel B are partitions $e$, which extend radially outward, and fit closely in vertical grooves in the inner side of the tub A. (See Fig. 3.)

Every alternate one of these partitions $e$ extends from the bottom of the tub A to within a short distance of the top of the inner vessel; and the intermediate partitions extend from the top of the vessel B to within a short distance of the bottom of outer vessel. (See Fig. 4.)

The bottom proper of the inner vessel B is solid, and upon it rests a number of feet or small stands, $d$, which support a false bottom, E.

This false bottom is made of perforated metal, and is composed of several pieces, in order to facilitate the insertion and removal of the same. The pieces may be semicircular, quadrantal, or sector shape, as desired, and, with the feet or stands $d$, may be removed at pleasure, to cleanse the vessel or for other purposes. On the top of the inner vessel rests a lid or cover, G, in the center of which is an opening, $g$. The outer edge of the cover G, and the edge of the central opening, $g$, are turned up, so as to form an annular pan or dish. (See Figs. 1 and 2.)

A partition, $f$, extends from the edge of the central opening $g$ to the outer edge of the cover G, and on one side of this partition is an outlet opening, $h$. The rim C is provided with openings through which water may enter, and escape under the bottom of the inner vessel B, and the outer vessel is provided with an inlet-tube, $J^1$, and an outlet-tube, $J^2$, between which tubes is one of the partitions $e$. The inner vessel is provided with an outlet-tube, K, extending outside of the outer vessel.

The beer or other liquid is introduced into the inner vessel through the central opening $g$ in the cover G, and is strained or filtered through the false bottom E, passing out of the vessel through the outlet-tube K. The cold water enters through the inlet-tube $J^1$, passing under the bottom of the inner vessel, and over and under the partitions $e$, as indicated by the arrows, and escapes through the outlet-tube $J^2$. At the same time cold water is introduced on the top of the cover G, from a pipe, L, on one side of the partition $f$, passing around, as indicated by the arrow, and escaping through the outlet opening $h$. In this manner a constant circulation of cold water is kept up, above, below, and all around the vessel containing the beer or other liquid to be cooled.

What I claim as new, and desire to secure by Letters Patent, is—

1. The cover G, formed with the central opening $g$, and provided with the partition $f$ and outlet opening $h$, in combination with the vessel B, as shown and described, for the purpose specified.

2. The combination of the outer vessel A, provided with vertical partitions $e$ and outlet-tube $J^2$, the inner vessel B, provided with the circular rim C, removable perforated false bottom E, and inlet-tube $J^1$, and the cover G, as shown and described, for the purpose specified.

H. W. BEINS.

Witnesses:
　HENRY T. BROWN,
　MICHAEL RYAN.